(12) United States Patent
Kessler

(10) Patent No.: US 7,794,771 B2
(45) Date of Patent: Sep. 14, 2010

(54) FREEZE-DRIED COFFEE TABLETS AND METHOD OF MAKING SAME

(75) Inventor: Ulrich Kessler, Orbe (CH)

(73) Assignee: Nestec S.A., Vevey (CH)

( * ) Notice: Subject to any disclaimer, the term of this patent is extended or adjusted under 35 U.S.C. 154(b) by 1114 days.

(21) Appl. No.: 10/530,998

(22) PCT Filed: Oct. 14, 2003

(86) PCT No.: PCT/EP03/11359

§ 371 (c)(1),
(2), (4) Date: Apr. 12, 2005

(87) PCT Pub. No.: WO2004/034798

PCT Pub. Date: Apr. 29, 2004

(65) Prior Publication Data

US 2006/0024420 A1  Feb. 2, 2006

(30) Foreign Application Priority Data

Oct. 14, 2002 (GB) ................................ 0223874.9

(51) Int. Cl.
*A23F 5/00* (2006.01)

(52) U.S. Cl. ................ 426/594; 426/595; 426/596; 426/597; 426/410; 426/414; 426/415; 426/293; 426/285; 426/89; 426/93; 426/512; 426/515

(58) Field of Classification Search ......... 426/594–597, 426/410, 414, 415, 293, 285, 89, 93, 512, 426/515
See application file for complete search history.

(56) References Cited

U.S. PATENT DOCUMENTS

| 1,367,725 | A | * | 2/1921 | Trigg | 426/388 |
|---|---|---|---|---|---|
| 1,951,357 | A | * | 3/1934 | Hall | 426/103 |
| 2,224,942 | A | * | 12/1940 | Weisman | 426/285 |
| 3,121,635 | A | | 2/1964 | Eldred | |
| 3,309,779 | A | * | 3/1967 | Ginnette et al. | 34/287 |
| 3,468,672 | A | | 9/1969 | Schwartzberg | |
| 3,511,666 | A | * | 5/1970 | Richards et al. | 426/394 |
| 3,573,060 | A | * | 3/1971 | Casten et al | 426/385 |
| 3,635,727 | A | * | 1/1972 | Ehrgott | 426/385 |
| 4,004,036 | A | * | 1/1977 | Schmitt | 426/285 |
| 5,298,261 | A | * | 3/1994 | Pebley et al. | 424/488 |
| 5,382,437 | A | * | 1/1995 | Ecanow | 424/499 |
| 5,455,057 | A | * | 10/1995 | Symbolik et al. | 426/385 |
| 6,287,596 | B1 | * | 9/2001 | Murakami et al. | 424/464 |
| 6,348,264 | B1 | * | 2/2002 | Abou-Nemeh et al. | 428/402 |
| 6,953,592 | B2 | * | 10/2005 | Darbyshire et al. | 424/489 |

FOREIGN PATENT DOCUMENTS

| CA | 918494 | | 1/1973 |
| CA | 964074 | * | 3/1975 |
| EP | 0916266 | | 11/2006 |
| FR | 479000 | | 1/1916 |
| FR | 1600708 | * | 9/1970 |
| GB | 413488 | * | 7/1934 |
| GB | 2196228 | * | 4/1988 |
| JP | 56068351 | | 6/1981 |
| WO | 02062152 | | 8/2002 |

* cited by examiner

*Primary Examiner*—Anthony Weier
(74) *Attorney, Agent, or Firm*—K&L Gates LLP

(57) ABSTRACT

The present invention relates to a coffee tablet which is obtainable by molding and freeze-drying a solution of coffee solids into a desired shape and which has improved dissolution properties and an appealing smooth and/or shiny surface appearance. The coffee tablet also has a closed surface pore structure and an internal pore structure wherein a majority of the pores in the pore structure are interconnected and have a size of between 5 and 50 micrometers. The coffee tablet can also include a coating of a coffee, a flavorant, a colorant or an aroma. The coffee tablet is packaged in an environment of an aroma to form a product that exhibits fresh and strong flavor and aroma characteristics when a beverage is prepared from the tablet even after long term storage of the tablet.

29 Claims, No Drawings

FREEZE-DRIED COFFEE TABLETS AND METHOD OF MAKING SAME

FIELD OF THE INVENTION

This invention relates to coffee tablets and a method for making and packaging them.

BACKGROUND OF THE INVENTION

Freeze-dried coffee extracts for use as "instant coffee" are usually produced as granules, whereby aqueous coffee extract with a dry substance content of approximately 40% wt/vol. is foamed to a foam weight of approximately 450 to 750 g/l, the composition is cooled for approximately 30 minutes on freezing belts to a foam temperature of approximately −45° C. and the frozen product is ground at −40 to −50° C. The thus obtained granules are screened at low temperatures in order to eliminate the fines with grain sizes of less than 0.5 mm and particles with grain sizes above 3 mm. The quantity of fines, i.e., of particles with grain sizes below 0.5 mm, usually accounts for 30 to 35% wt. of the frozen total product. After screening, approximately 95% of the granules have grain sizes in the range from 0.5 to 3 mm, but often up to 5% of fines with grain sizes of 0.5 mm or less are still present. The proportion of particles between 0.5 mm and 1 mm is approximately 10 to 20% of the screened product. These granules are usually poured into trays and freeze-dried at operating pressures between 0.3 and 0.4 mbar (Capacitron values, corresponding to Thermotron values of approximately 0.4 to 0.6 mbar). The freeze-dried end-product normally has a bulk density of approximately 230 to 260 g/l.

A number of processes have been proposed in the prior art for producing "instant coffee" which readily dissolves in hot water and is commercially available as bulk powder contained in a sealed jar. While these have been successful, there has been a desire to improve such products. For example, there has been a need to provide "instant coffee" which can be conveniently dosed, and for which the strength of the resulting beverage can be easily controlled. Thus, the prior art has attempted to develop coffee tablets or cubes in an attempt to remedy these deficiencies.

Coffee tablets or cubes are generally prepared from soluble coffee extractives. This method involves subjecting ground coffee beans to the action of an extracting solvent and evaporating the concentrate abstract to the condition of an agglomerate, which is compressible into tablet form. Such coffee tablets and extraction procedures for preparing the same are described in U.S. Pat. No. 1,137,265 to Hubner and U.S. Pat. No. 3,121,635 to Eldred. These coffee tablets have not been commercially successful, most likely because they are subject to breakage due to their fragility and also because such tablets do not possess the same degree of aroma and flavor as other forms of powdered coffee. Further, low solubility is likely to result from strong compactation of the agglomerates. In this case the tablet strength may be very high but the solubility very low.

Canadian patents 964074 and 918494 teach that foaming or partly freezing of the coffee extract prior to the shaping of the coffee tablet can be used to give a more porous structure. It has however been found that this may result in a pore structure that is too open and that results in a less well defined shape. In addition to an unattractive appearance, tablets made according to these patents are also somewhat more susceptible to breakage and production of fines in the packages in which they are provided.

In an effort to reduce breakage and increase strength and ductility of the tables, it has been proposed to include binders in such tablets. For example, U.S. Pat. No. 1,951,357 to Hall describes a method of forming a compressed coffee tablet by incorporating with the coffee extract a liquid binder containing gelatin and dextrin. However, coffee tablets formed by these procedures have disadvantages in that the flavor of the pure coffee extractive is lost in the course of formulation since the extrinsic binder or vehicle is never completely removed from the beverage, and this loss contributes to the less desirable taste and appearance of the beverage. While it is possible to include a different binder material with the active ingredient to hold the tablets together, the use of conventional binders in coffee tablets is undesirable, because it results in a coffee beverage, rather than a pure coffee product, and the extraneous ingredients can adversely affect the taste characteristics of pure coffee.

U.S. Pat. No. 4,975,295 discloses a water-soluble coffee tablet made if a mixture of roast and ground coffee and an agglutinating agent. As the roast and ground coffee is not fully soluble in water, solids remain after the coffee is brewed. This requires a filter or other separation means to prevent the solids from appearing in the liquid coffee that is prepared from the tablet.

In addition, as noted above, known coffee tablets are hygroscopic and require special packaging in order to prevent moisture pickup. In addition, such tablets have a tendency to lose their aroma and flavor over time during storage. U.S. Pat. No. 4,975,295 does recognize this problem and suggests packaging the tablets in an impervious wrapping or a sealed enclosure. However, if the packaging is too tight around the tablet, this could lead to breakage. Thus, improvements over the products of this patent are desired.

Coffee is a beverage that has a taste and aroma which is can be found more desirable when the coffee beverage is fresh since the aroma may degrade over time and become "stale." This is because the compounds which contribute flavor to the coffee are organic in nature and the flavor is the most desirable immediately after the coffee is brewed because the compounds which impart the flavor have not degraded. Over a period of time the organic compounds of the coffee oxidize by combining with oxygen in the water from which the coffee is brewed and the oxidation results in the degradation of the coffee and the loss of the desirable flavor. While conventional packaging is used in an attempt to control this, it may still remains as a problem.

Accordingly, there is a need for a coffee tablet that has a good appearance, is sufficiently strong and ductile to resist breakage and is capable of retaining its flavor and taste during storage. The present invention aims to provide such tablets. A further aim is to provide a coffee tablet with an acceptable solubility.

SUMMARY OF THE INVENTION

The present invention relates to a coffee tablet having a three-dimensional shape with a smooth outer surface with a closed surface pore structure and an internal pore structure wherein a majority of the pores in the internal pore structure are interconnected and have a size of between 5 and 50 micrometers. The tablet also includes coffee solids therein and is of a size sufficient to prepare a coffee beverage when one or more are added to an appropriate amount of hot water or other liquids, e.g. hot milk. Generally, one tablet corresponds to one six ounce cup of coffee but the user can add further tablets depending upon the volume of water or liquid in the cup to control coffee strength and/or taste. Alternatively, the coffee tablets may be of smaller size to allow the user to choose the number of tablets corresponding to the desired strengths for the desired cup size. For example, the tablets may be of 0.1 g per unit. For a medium cup concentration 15 beans may be used to prepare a cup with 100 ml of hot water.

Preferably, the coffee tablet has the shape of a disc or polygon and a smooth or shiny surface, which contribute to the visual appealability of the tablet. Both the shape and the smooth surface can be obtained by molding a coffee composition that contains coffee solids in a smooth or polished mold. Also, the smooth outer surface can be obtained by compression molding of the coffee composition. An example of such compression molding is e.g. molding in a roller press or molding by die press forming.

Furthermore, the smooth outer surface can be obtained by partially freezing the coffee composition into a slush, molding the partially frozen slush to form the three-dimensional shape; with the option of coating the shape with coffee. This may be done by immersing the frozen tablet into a concentrated coffee extract at a temperature range of between −5 to 20° C. The concentration of the liquid coffee extract can preferably vary between 20 and 60% coffee solids (dry matter) to provide the desirable surface qualities.

A gas is preferably added to the coffee composition before it is frozen in the mold to assist in creating the internal pore structure. This is done without significantly affecting the smooth outer surface or the shape of the tablet. Thereafter, a coffee aroma can be provided adjacent the tablet as well as in the pore structure of the tablet to retain flavor and aroma during storage. Additionally, a flavorant, a colorant or an additional aroma can be associated with the tablet, preferably in the form of a coating on the tablet.

In the present context the smooth outer surface is a surface, which is characterized by the absence of significant surface asperities. This evaluation may be based on both judged by visual observation or by using a scanning electron microscope (SEM). In the present context the smooth outer surface with a closed surface pore structure is a surface, which shows a low degree of surface porosity, i.e. surface openings which allow access to the inner particle pore structure. The closed surface pore structure preferably is a surface pore structure with a porosity of about 10-35%, the surface porosity being defined as the ratio of the cumulative surface pore cross-sectional area and the overall outer surface area of the particle (or embodiment). The mean surface pore size is typically in the order of 5-35 micrometer, as can be determined using a conventional scanning electron microscope (SEM).

The coffee tablets according to the invention has as mentioned above an internal pore structure wherein a majority of the pores in the internal pore structure are interconnected and have a size of preferably between 5 and 50 micrometers, more preferably between 10 and 50 micrometers. This can be measured by analyzing a cross-section of a tablet in a conventional scanning electronic microscope (SEM).

The tablet's corresponding density may be determined using a Helium pycnometer to determine the particle density which gives values close to those of the dried soluble coffee matrix, i.e. >1450 g/l. The high density value measured by Helium pycnometry indicates, that the pore connectivity of the porous structure is fairly high. This includes the surface porosity which, using optical analysis, can be characterized as rather low. In case of an extract solid matter content of around 50% and assuming a connectivity of the porous structure of 100% this corresponds to an overall porosity approximately 60%, with the porosity being defined as the ratio of particle pore volume and particle overall volume. Based on the above assumptions the tablet porosity and density can be calculated.

The coffee tablet preferably has an overall porosity in the range of 50 to 80% and a density in the range of 800 to 300 g/l, more preferably from 60 to 70% and from 600 to 450 g/l respectively. The typical individual particle density of the coffee tablet is thus higher than the corresponding value for standard freeze dried coffee particles which is typically about 400 g/l.

It has surprisingly been found that a coffee tablet according the invention with the indicated close surface properties and the internal pore structure, is obtained which has a desirable smooth outer surface, a sufficient strengths to prevent easy breakage, and while retaining an acceptable solubility. For example, a coffee tablet of 0.1 grams typically dissolves in hot water within a few seconds.

The invention also relates to a packaged coffee product comprising at least one coffee tablet as described herein, a package of a moisture resistant material for containing the tablet(s) therein, and a coffee aroma present in the package in an amount sufficient to retain the flavor and aroma of the coffee tablet(s). A preferred product includes a coffee aroma that contains aromatic volatiles as the aroma and between 1 and 8 tablets in the package. The tablet can include a coating of a coffee, a flavorant, a colorant or an aroma.

The packaging material preferably comprises a flexible laminate having at least two layers, and is substantially impervious to permeation by gas or moisture. The coffee tablet(s) are sealed in the package to retain their flavor and aroma until the time when the beverage is to be prepared. The layers of the flexible laminate packaging material advantageously comprise paper or a plastic film, and optionally include a metallized or colored paper surface.

Yet another embodiment of the invention relates to a method for forming a coffee tablet for preparing a coffee beverage when added to an appropriate amount of hot water. This method comprises molding a coffee composition that contains coffee solids in a mold while adding a gas thereto to form a coffee tablet having a three-dimensional shape that conforms to that of the mold and that has a smooth and/or shiny outer surface and a closed surface pore structure. The mold is preferably smooth or polished. As noted above the gas added to the coffee composition is contributing to the forming of the internal pore structure, with a majority of the pores in the pore structure being interconnected and having a size of between 5 and 50 micrometers, preferably 10 and 50 micrometers.

Although any shapes can be made, the mold preferably has a cavity that provides the shape of a disc or polygon or imitates a coffee bean, and the smooth outer surface of the tablet(s) can be obtained in a number of ways. The smooth outer surface may be obtained by freezing the coffee composition in the mold, e.g. by pouring liquid coffee composition into a mold, or by passing the coffee composition through a roller press or by molding by means of die press forming or by compression molding of frozen fines of the coffee composition in the mold. When the tablet is obtained by partially freezing the coffee composition into a slush and molding the partially frozen slush to form the three-dimensional shape, it may be necessary to coat the shape with coffee to provide the smooth or preferably shiny outer surface. As above, the tablet can be immersed into a concentrated coffee extract at a temperature range of between −5 to 20° C. wherein the concentration of the liquid coffee extract can preferably vary between 20 and 60% coffee solids (dry matter) to provide suitable surface qualities. A coffee aroma can be provided in the pore structure of the tablet to retain flavor and aroma of the tablet during storage. As above, the tablet can include a coating of a coffee, a flavorant, a colorant or an aroma.

The method includes the further step of providing a packaged coffee product by placing at least one coffee tablet in a package of one of the moisture resistant materials disclosed herein. Also a coffee aroma can be provided in the package in an amount sufficient to retain the flavor and aroma of the coffee tablet during extended storage in the package. A preferred aroma is coffee aroma that contains aromatic volatiles and between 1 and 8 tablets are generally present in the package.

Additional features and advantages of the present invention are described in, and will be apparent from, the following Detailed Description of the Preferred Embodiments.

DETAILED DESCRIPTION OF THE PREFERRED EMBODIMENTS

The present invention now provides an "instant" coffee composition in tablet or cube form having has improved dissolution properties and taste. This tablet is a freeze-dried coffee extract that satisfies the highest quality requirements. In addition, the present invention provides a coffee tablet product package that preserves the aroma and flavor of the coffee tablet. The tablet and its packaging are designed to retain the necessary physical properties of the tablet in order to enhance the flavor, taste and aroma of the resulting beverages that are formed from the tablets.

Surface properties have been found to be an important feature of the acceptability of a coffee tablet product to a customer. The present invention provides coffee tablets that have a very smooth and even shiny outer surface that is appealing to consumers. This is particularly appealing when the tablet has a unique shape, such as that of a coffee bean, a bead, a star, a caricature or other recognizable shape. The coffee tablet may however also be smooth and have a mat surface appearance. This will depend on the surface property of the mold.

Also, the porosity of the tablet is engineered so that good solubility of the tablet is achieved. A gas is added to the liquid coffee solution before the shape is formed. Generally, any inert gas can be used, with nitrogen or carbon dioxide being preferred. The addition of the gas results in a novel porous structure within the formed shape. Furthermore, the internal pores in the tablet are interconnected to facilitate solubility of the tablet in water when the liquid coffee drink is being made. A majority of these pores have a size of between 5 and 50 micrometers. Preferably, at least about 65% of the pores have this size. The described pore structure enables the tablet to dissolve acceptably rapidly in hot water without the need for any excessive stirring or other agitation. At the same time the closed surface pore structure provides for a coffee tablet a certain contribution to the mechanical strength of the particle/tablet and its resistance to breakage attrition The present invention also provides an aroma experience during beverage preparation from the coffee tablet product. This is achieved by including a coffee aroma in the package that contains the tablet or tablets in order to retain the freshness, aroma and flavor of the tablet during storage, as well as so that the consumer can experience the aroma when opening the package and when making the beverage. In some cases, these properties can be imparted into the beverage that is formed from the tablet.

This invention provides a readily water-soluble coffee tablet that is prepared by molding and freeze-drying a coffee extract solution into a definite shape. The coffee tablet is produced by placing a liquid coffee extract into a mold and freezing the extract into discrete shapes. The mold surfaces should be sufficiently smooth or even polished to impart a smooth and/or shiny surface to the shapes. The smoother the mold surface, the higher smoothness and shinier surface would be provided, but the mold should not be too smooth to detract from the drying properties of the molded shapes. The mold surface has three functions, firstly to impart certain surface characteristics to the tablet shape; secondly to ensure an easy release of the tablet shape from the mold after freezing, and thirdly to facilitate and enhance drying of the shapes to form the final tablets. For the latter, it has been observed that some mold surface roughness may be required to nucleate ice crystal formation during the freezing or solidification step wherein these ice crystals enhance the subsequent drying of the tablet shapes.

The invention also adjusts the solids concentration of the extract and the temperature to which it is subjected in the mold such that residence in the mold cavities for a short period of time permits the extract to develop a semisolid state of sufficiently firm consistency such that, when ejected from the mold, it has the capability of retaining its shape and form. In this regard, the ambient temperature conditions should be such that the molding of the extract takes place either isothermally or at a depressed temperature.

In an alternative embodiment, a coffee extract is frozen and ground to produce frozen fines of less than 2 mm and preferably less than 1 mm. The frozen fines are then compression molded in mold cavities that have the sufficiently smooth surfaces described above in order to produce tablets having a smooth outer surface. This is distinguished from a cast or extruded product that would have sudden elevations on their surfaces. Also, such products exhibit porosity from gas bubbles and small fissures. The color of such products would also be slightly heterogeneous. In comparison, the molded tablet surface does not include sudden or abrupt elevations and instead has gradual and smooth surface changes. Tablets molded from such fines also possess a dull matte rather than shiny surface color that is substantially uniform in appearance. The individual or aggregated fines however are somewhat visible in the final product, but this does not detract from the overall appealing appearance of the tablets.

There is also provided a coffee tablet that is produced by partially freezing the extract into a slush, molding the slush by freezing it into the desired shape and then removing it from the mold. These steps can be essentially the same as those disclosed in Canadian patent 964074. The term "slush" as used in this specification is intended to mean a partially frozen extract in which water in the form of ice is crystallized from the extract and is dispersed throughout a matrix of unfrozen liquid extract which, due to the crystallization of the water, has a higher concentration of soluble solids than that of the original unchilled extract.

As the resulting surface of the tablet prepared in that manner is generally too rough and porous, the resulting tablets are then coated with coffee to provide the desired smooth and/or shiny outer surface. The desired outer surface can be achieved by immersing the frozen tablet into a solution of a concentrated coffee extract. The extract then dries to form a smooth and somewhat shiny surface that is appealing to consumers. The extract is generally maintained at a low temperature of between −5 to 20° C. The exact concentration of the liquid coffee extract is not critical and good surface qualities can be achieved when the concentration is in the range of between 20 and 60% coffee solids (dry matter). While these concentrations provide suitable surface qualities, these qualities do differ somewhat and provide the skilled artisan with the ability to provide slightly different surface finishes as desired for the final product. For example, different surface finishes can be used to differentiate between different products.

The molding apparatus of the invention provides a multiplicity of small cavities into which the liquid coffee extract is placed. The specific size can vary from a rods or disks, cylinders, polygons, such as rectangles, squares or others, or combinations thereof, e.g., cones, stars, prisms, tetrahedrons or octagons as well as other shapes including figures or character outlines, and coffee beans. The opened-topped cavities are preferably of a volume of between about 0.2 to 20 cc and preferably about 4 to 10 cc. Understandably, the exact size is not critical and is selected primarily to form tablets of sizes that are most suitable for use. While a single table is envisioned for making a single cup of coffee, it is also within the scope of this invention to provide smaller tablets where the user can combine multiple tablets to form a single cup of coffee with the desired strength. Multiple tablets are also useful since cup volumes can vary greatly depending upon the desires of the consumer, and multiple tablets can be added to prepare the desired strength of the final beverage.

According to the invention it has been found that the molding step has the advantage of creating a shiny/glassy surface of the tablet, since it conveys an indication of high quality for the coffee tablet. In addition the product surface pore structure discussed above is obtained. Further, the benefit of tablet freeze-drying is two-fold: first, it prevents fines from forming compared to the standard freeze-drying process, thus avoids the necessity of its elimination by screening, or its recycling or reprocessing. Second, the freeze-drying technique contributes to the desirable pore size and porosity in the molded shapes, thus contributing to good solubility of the final tablets.

Upon being released from the molds, such as by inverting the molding apparatus and/or by ejection with a jet of gas or mechanically e.g., a spring, the tablet shapes are then freeze dried to remove water. Typically, the frozen shapes are placed into a freeze-drying chamber at a temperature of −40 to −50° C. to sublime water and form a dry tablet. Preferably, the coffee extract is first slightly frozen to a point whereof about 25% to about 30% of the water content forms large ice crystals.

Another embodiment of the invention relates to the addition of an aroma, a flavorant or a colorant to the shapes and resulting tablets. While these can be added to the coffee composition that is to be frozen in the mold, a more convenient way to do this is to incorporate one or more of these additives to the coffee extract solution that is used for coating the tablets. Alternatively, a second coating step can be used to apply these materials to the tablet. The advantage is that the tablet can then product a flavored or different colored beverage. For example, a flavor such as mint, vanilla, hazelnut or the like can be added to the tablet by way of the coating. In addition to imparting this flavor to the beverage that is prepared, these flavors can also impart an aroma in the package environment that is imparted to the packaged tablet(s). These aromas are released when the package is opened. The flavorant can also be a sweetener, such as sugar or an artificial sweetener can be added to the tablet or the coating thereon to impart sweetness to the beverage. Certain sweeteners can impart a slightly different surface appearance that is desirable for certain products. Food colors can be added to impart novel effects to the tablets, such as to correlate the color with the particular flavor or type of beverage that is produced. The color or flavor can be one that is different from that of the tablet to provide an interesting contrast in the tablet and in the beverage that is to be prepared from it.

The completed tablets are dosified, which is usually sufficient to make one six-ounce cup of coffee per tablet. Placed in a cup of boiling water a single tablet will dissolve completely essentially without stirring in less than about 60 seconds. Preferably, each tablet weighs about 0.5 to 4 grams and has a diameter of about 26 mm of thickness. A preferable dosage is 2 g. The preferred dimensions give a tablet that is thick enough to resist fracture and offers a relatively large ratio of surface-to-water volume for rapid dissolution. The tablets can be formulated into any desired shape although it is preferred that the coffee tablets be circular or oval shaped disks or a shape that imitates a coffee bean.

The invention further relates to a coffee package that the coffee tablet is housed. The coffee tablet product can be individually wrapped in heat-and-humidity-resistant material, such as plastic film, metallic foil or combinations or laminates thereof. Alternatively, the coffee tablets may be stored without individual wrapping in air-tight and aroma-tight containers for long periods without deterioration.

In a preferred embodiment, the package is comprised of a flexible laminate package material shaped so as to define a product enclosure constructed with side walls, end walls, a generally rectangular bottom portion having long sides and short sides, and overlapping top portion. The overlapping top portion includes upper portions of side walls and upper portions of end walls. The upper portions form flaps and the upper portion form infolded gussets. A hand peelable seal extends all around the interior of these upper portions. The closure structure is formed as flaps and are closed onto infolded gussets, leaving a central part between the innermost ends of the gussets where the side walls are sealed to each other and other parts outward where the side walls are sealed to the facing walls of the gussets. In the center of flaps, a central grippable raised tab means is provided which is designed to be positioned above and integral with heat seal region, and which will facilitate opening of the package. The tab is preferably constructed integrally with the seal region to provide sufficient grip strength so that the package can be opened quickly and conveniently by the consumer. Additionally, the grippable raised tab is preferably constructed so that a substantial part of tab will not overlap with the gusset area. Constructing the package in this manner further ensures that only the proper force needed to open the package will be applied to the tab and thus improper tearing of the tab during opening will be avoided.

In practice, the actual size and shape of package can vary greatly and will be dependent in large part upon the size and type of product that will be packaged therein. As best observed, the package can be formed into the shape of a bag-like enclosure having side walls, end walls, bottom portion and top portion containing the sealable region and the raised grippable tab. This upright bag-like product enclosure can be filled, folded and sealed using conventional means well known in the art. In one embodiment of the invention, the package filled with the desired dry granular product will remain in the form of a bag-like enclosure. In the preferred embodiment, however, the packaging material is drawn tightly around the food product, which is formed into the shape of a brick, and the package is vacuum sealed. This tabbed brick package can then be stacked, packed in cartons and eventually marketed to consumers in this form.

The package of the present invention can be made from any flexible laminate material well known in the art that can be formed into a package suitable for containing dry granular food products. It is preferred that package be one that is formed with a hand-peelable heat seal that is capable of retaining a vacuum. A number of materials and configurations are possible for the package of the invention, such as the package and peelable seal embodiments as described in U.S. Pat. No. 4,944,409 (Busche et al.) and U.S. Pat. No. 4,488,647 (Davis).

In another preferred embodiment, the package of the present invention can be constructed with a peelable heat seal such as that disclosed in U.S. Pat. No. 4,944,409 (Busche et al.). In this embodiment, the package will include a first and second package wall joined about three edges so as to form a bag-like product enclosure with an open top. The first of these walls preferably comprises a thermoplastic polymeric film of three layers, with a middle layer disposed between an inner sealant layer and an outer layer. The middle layer is peelably bonded to either the inner or outer layer, and permanently bonded to the other. The second package wall comprises an outer layer and an inner sealant layer. It is preferred that the outer layers of both walls be comprised of either ethylene vinyl acetate copolymer, linear low density polyethylene, low density polyethylene, neutralized ethylene acid copolymer or other suitable extrudable polyolefin polymers or copolymers. The inner sealant layers are designed so that when sealing is desired, these two layers are brought adjacent each other and bonded by heat using conventional sealing machinery. The inner layers as composed of any suitable materials which are known to seal well to themselves, such as the materials used to construct the outer layers discussed above. Generally, the outer layers have a thickness between about 0.2 and 1.6 mm, and the inner layers are roughly about 0.04 to 0.2 mm in thickness.

The middle layer of the first package wall of this preferred embodiment is selected to have a relatively low peel strength when peelably bonded to either the first outer layer or inner sealant layer of the first wall. The middle layer is preferably constructed of a combination of polybutylene and either ethylene vinyl acetate copolymer, linear low density polyethylene, neutralized ethylene acid copolymer or unneutralized ethylene acid copolymer, and has a thickness of about 0.04 to 0.2 mm. In this preferred embodiment, peel failure is designed to occur between the first inner sealant layer and the middle layer where the bond is the weakest, and the preferred force required to achieve peel failure is roughly between 600 and 1800 grams per inch width.

The package of the present invention can also be formed from a flexible laminate material such as that disclosed in U.S. Pat. No. 4,488,647 (Davis). In this embodiment, the laminate material has a ply capable of carrying printing, a barrier ply to which the exterior ply is laminated, and a sealing ply, which forms the inner surface of the package enclosure. A hand-peelable seal is provided on top portion of the package by means of a heat-fusible plastic polymeric coating. The seal is arranged to provide sufficient strength to retain a vacuum within the package while being shipped and handled, yet is also capable of being opened by hand using the tabbed gripping region to pull apart the package flaps.

The seal for the package described above may be comprised of ethylene vinyl acetate, with an optional added amount of magnesium silicate. In one such embodiment, the material that seals the laminate package of the invention is comprised of about 80 to 90% ethylene-vinyl acetate and about 10 to 20% magnesium silicate. The heat seal applied at seal region is bonded after the package is filled with product using any conventional sealing machine known in the art such as a heat seal bar capable of applying heat and pressure to the seal region. It is preferred that the heat seal is formed with a suitable seal strength so that it can retain a vacuum, yet still be peeled open easily by the consumer using the grippable tabbed region. In general, seal strengths of from about 600 to 1800 grams per inch width are preferred for the heat seal of this embodiment of the invention.

In another embodiment, the package 10 of the invention may also be constructed from a flexible laminate material comprising a four-ply structure having an outer clear polyester layer, an aluminum foil layer next to the polyester, a nylon intermediate layer and an inner layer of polyethylene. In manufacturing this laminate, the polyester, aluminum foil, nylon and polyethylene layers can be formed into a single web structure, and printing may be applied to the polyester layer using conventional multi-color gravure or other suitable methods. Additionally, a web structure having an outer foil layer with the name of the product or other suitable information printed thereon can be formed, and a clear polyester layer can be applied over the foil to finish the laminate.

As discussed above, the package of the present invention is preferably constructed by first fashioning the flexible laminate material formed into a bag-like product enclosure by any of the various conventional methods known. The package thus is first formed in the shape of a typical "stand-up" square bottomed bag, comprising bottom, side walls, and the sealable top portion, all which define product enclosure. The bag-like enclosure can then be used to form a brick-type package around the desired product in any conventional manner known in the art. Although in the preferred embodiment the package is designed to contain a coffee product, such as whole coffee beans, roast and ground coffee or other coffee product in dry form, the package can be used to contain any other dry granular food product that is desired to be packed in sealable vacuum packages, such as cocoa, tea, non-fat milk powder and powdered beverage mixes.

As will be clear to one skilled in the art, the package, made of a flexible laminate material as described above, is formed by means of conventional folding, gusseting and heat sealing techniques. In the preferred embodiment, the opposing flaps and the gussets are brought together to form a heat seal at region. The gussets preferably extend inwardly toward the center, but the ends do not meet. As will be obvious to one skilled in the art, the bag will be retained in the open configuration such as observed while the package is filled by conventional means, and the folding and sealing of the package is carried out after the product has reached the desired level. In the particularly preferred embodiment, the package can be sealed using vacuum sealing means well known in the art.

It will be well understood by one skilled in the art that the dimensions of the package of the invention are variable, and will depend on the size and dimensions of the product to be packaged. In the preferred embodiment of the tabbed region, the maximum height from the upper end of the sealable region to the end of tab is about 14 mm. In this embodiment, the sealable top portion is roughly about 30 mm at its maximum height, the sealable region is about 6 mm in thickness, and the recess between the generally horizontal upper edge and the upper end of the sealable region is about 6 mm at its shortest width. It is feasible to extend the grippable tab region above the sealable region to approximately 16 mm. The grippable tab region should be at least about 12 mm at its maximum width (from top to sealing region) to obtain a good easy-to-open package.

The tabbed easy open package of the present invention can be used for a wide variety of products, and provides a distinct advantage in terms of grippability and ease of opening. Although the package of the present invention has been described in terms of the specific embodiments above, it will be clear to one skilled in the art that many alternative embodiments and materials not specifically described herein are possible which fall within the scope of the invention.

The packaging of the coffee tablet product has the advantage of preserving well the shinny/glassy surface of the tablet creating by the molding step. Packaging is also important in protecting the product against moisture, thus contributing to maintaining good solubility of the product. Furthermore, individual packaging of the coffee tablets would give great conveniences of a single serve package.

As noted above, a finite number of tablets can be packaged. In the most preferred embodiment, individual packing is preferred option due to avoid problems with secondary tightness causing aroma losses and undesired moisture uptake. However, a small numbers such as between 2 and 8, can be envisioned for a small group that is desirous of making coffee. These can be included in a package that provides mechanical protection of the tables. This can be done is some instances in the same way as hard candy. Large numbers of coffee tablets in a jar is possible but not preferred due to the difficulty of retaining the aroma environment in the jar as the tablets are removed.

Also, the sealed packaging of the coffee tablets makes it possible to maintain the coffee tablet product in an aroma until it is ready to be served. The aroma which the coffee tablet product is exposed in should originate from or assimilate to that of aroma from roasting of coffee beans. The aroma could be introduced to the package before the package is sealed. Or, alternatively, the aroma can also be included in a compartment of the package separate from the coffee tablet product. Still the aroma can be incorporated into instead of with the coffee tablet by adding it to the coffee slush or powder mixture before subjecting those to molding.

It should be understood that various changes and modifications to the presently preferred embodiments described herein will be apparent to those skilled in the art. Such changes and modifications can be made without departing from the spirit and scope of the present invention and without diminishing its intended advantages. It is therefore intended that such changes and modifications be covered by the appended claims.

What is claimed is:

1. A soluble coffee tablet having
   a three-dimensional shape with a smooth outer surface and a closed surface pore structure;
   an internal pore structure wherein a majority of the pores in the internal pore structure are interconnected and have a size of between 5 and 50 micrometers; and
   the soluble coffee tablet comprising coffee solids therein and the coffee tablet being of a size sufficient to prepare a coffee beverage when one or more soluble coffee tablets are added to an appropriate amount of hot water and dissolve in the hot water to form the coffee beverage.

2. The coffee tablet of claim 1, wherein the shape is selected from the group consisting of a disc, polygon, coffee bean, and combinations thereof, and the smooth outer surface is obtained by molding a coffee composition that contains coffee solids in a smooth or polished mold.

3. The coffee tablet of claim 1, wherein the smooth outer surface is obtained by partially freezing the coffee composition into a slush, molding the partially frozen slush to form the three-dimensional shape, and coating the shape with coffee.

4. The coffee tablet of claim 3, wherein coating is provided by immersing the frozen three dimensional shape into a concentrated coffee extract at a temperature range of between −5 to 20° C. with the liquid coffee extract having a concentration of between 30 and 60% coffee.

5. The coffee tablet of claim 2, wherein a gas is introduced into the coffee composition before it is introduced into the mold to create the pore structure.

6. The coffee tablet of claim 1, wherein a coffee aroma is present adjacent the tablet to retain flavor and aroma during storage.

7. The coffee tablet of claim 1, comprising at least one component selected from the group consisting of a flavorant, a colorant, an additional aroma, and combinations thereof.

8. The coffee tablet of claim 7, wherein the flavorant, colorant or additional aroma is provided in a coating on the tablet.

9. A coffee tablet according to claim 1, wherein the coffee tablet has an overall porosity of 50 to 80% and density of 800 to 300 g/l.

10. A packaged coffee product comprising at least one soluble coffee tablet having:
    a three-dimensional shape with a smooth outer surface and a closed surface pore structure, an internal pore structure wherein a majority of the pores in the internal pore structure are interconnected and have a size of between 5 and 50 micrometers, and the soluble coffee tablet comprising coffee solids therein and the soluble coffee tablet being of a size sufficient to prepare a coffee beverage when one or more soluble coffee tablets are added to an appropriate amount of hot water and dissolve in the hot water to form the coffee beverage;
    a package of a moisture resistant material for containing the at least one soluble coffee tablet therein, and
    a coffee aroma present in the package in an amount sufficient to retain the flavor and aroma of the soluble coffee tablet.

11. The packaged coffee product of claim 10, wherein the aroma is coffee aroma that contains aromatic volatiles and between 1 and 8 tablets are present in the package.

12. The packaged coffee product of claim 10, wherein the package material comprises a flexible laminate having at least two layers, which material is substantially impervious to permeation by gas or moisture and the coffee tablet(s) are sealed therein.

13. The packaged coffee product of claim 10, wherein the layers of the flexible laminate packaging material comprise a material selected from the group consisting of paper and plastic film.

14. A method for forming a soluble coffee tablet for preparing a coffee beverage when added to an appropriate amount of hot water to dissolve in the hot water to form the coffee beverage, comprising the steps of molding a coffee composition that contains coffee solids while adding a gas thereto to form a soluble coffee tablet having a three-dimensional shape that conforms to that of the mold and that has a smooth outer surface and a closed surface pore structure, wherein the amount of gas added to the coffee composition is sufficient to form a internal pore structure, with a majority of the pores in the pore structure are interconnected and have a size of between 5 and 50 micrometers.

15. The method of claim 14, wherein the mold has a cavity that creates a coffee tablet that has a shape selected from the group consisting of a disc, polygon, a coffee bean, and combinations thereof.

16. The method of claim 14, wherein the smooth outer surface is obtained by freezing the coffee composition in the mold.

17. The method of claim 14, comprising the steps of obtaining the smooth outer surface by partially freezing the coffee composition into a slush, molding the partially frozen slush to form the three-dimensional shape; and coating the shape with coffee.

18. The method of claim 17, comprising the steps of providing the coating by immersing the frozen three dimensional shape into a concentrated coffee extract at a temperature range of between −5 to 20° C. with the liquid coffee extract having a concentration of between 30 and 60% coffee.

19. The method of claim 14 comprising the step of providing a coffee aroma adjacent the tablet to retain flavor and aroma of the tablet during storage.

20. The method of claim 14, which further comprises associating at least one of a flavorant, a colorant and an additional aroma with the tablet.

21. The method of claim 20, wherein the flavorant, colorant or additional aroma is provided in a coating on the tablet.

22. The method of claim 14 comprising providing a packaged coffee product by placing at least one coffee tablet in a package of a moisture resistant material.

23. The method of claim 22 comprising providing a coffee aroma in the package in an amount sufficient to retain the flavor and aroma of the coffee tablet during storage in the package.

24. The method of claim 23, wherein the aroma is coffee aroma that contains aromatic volatiles and between 1 and 8 tablets are present in the package.

25. The method of claim 22, wherein the package material comprises a flexible laminate having at least two layers, which material is substantially impervious to permeation by gas or moisture and the coffee tablet(s) are sealed therein.

26. The method of claim 25, wherein the layers of the flexible laminate packaging material comprise a material selected from the group consisting of a paper film, a plastic film, and combinations thereof.

27. A coffee tablet produced by the method of claim 14.

28. The packaged coffee product of claim 13, wherein the material has a metallized surface.

29. The method of claim 26, wherein the layers of the flexible laminate packaging material comprise a metallized surface.

* * * * *